United States Patent
Oppenheimer

(10) Patent No.: US 11,059,221 B2
(45) Date of Patent: Jul. 13, 2021

(54) THREE-DIMENSIONAL (3D) PRINTING

(71) Applicant: HEWLETT-PACKARD DEVELOPMENT COMPANY, L.P., Houston, TX (US)

(72) Inventor: Charles Oppenheimer, Lake Oswego, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 273 days.

(21) Appl. No.: 16/072,151

(22) PCT Filed: Apr. 29, 2016

(86) PCT No.: PCT/US2016/029920
§ 371 (c)(1),
(2) Date: Jul. 23, 2018

(87) PCT Pub. No.: WO2017/188967
PCT Pub. Date: Nov. 2, 2017

(65) Prior Publication Data
US 2019/0030796 A1    Jan. 31, 2019

(51) Int. Cl.
| | |
|---|---|
| B29C 64/165 | (2017.01) |
| B33Y 40/00 | (2020.01) |
| B08B 7/02 | (2006.01) |
| B29C 64/35 | (2017.01) |
| B29C 64/30 | (2017.01) |
| B33Y 10/00 | (2015.01) |
| B33Y 30/00 | (2015.01) |
| B29C 64/245 | (2017.01) |
| B29C 64/268 | (2017.01) |

(52) U.S. Cl.
CPC .............. *B29C 64/165* (2017.08); *B08B 7/02* (2013.01); *B29C 64/245* (2017.08); *B29C 64/268* (2017.08); *B29C 64/30* (2017.08); *B29C 64/35* (2017.08); *B33Y 10/00* (2014.12); *B33Y 30/00* (2014.12); *B33Y 40/00* (2014.12)

(58) Field of Classification Search
CPC ................................ B33Y 30/00; B33Y 40/00
See application file for complete search history.

(56) References Cited

U.S. PATENT DOCUMENTS

| | | |
|---|---|---|
| 7,141,207 B2 | 11/2006 | Jandeska et al. |
| 2001/0045678 A1 | 11/2001 | Kubo et al. |
| 2004/0084814 A1 | 5/2004 | Boyd et al. |

(Continued)

FOREIGN PATENT DOCUMENTS

| | | |
|---|---|---|
| CN | 204936211 | 1/2016 |
| JP | 2013075389 | 4/2013 |
| WO | WO-03068468 | 8/2003 |

OTHER PUBLICATIONS

Krassenstein, These 3D Printer Shock Absorbers Will Reduce Vibrations and Keep Your House Silent at Night, 3dprint.com, Jul. 9, 2015, 3DR Holdings, LLC.

(Continued)

*Primary Examiner* — Kelly M Gambetta
(74) *Attorney, Agent, or Firm* — Dierker & Kavanaugh PC

(57) ABSTRACT

In an example implementation, a method of operating a three-dimensional (3D) printing system includes forming a fused 3D object in the printing tray of a 3D printer and vibrating the tray to separate unfused material from the fused 3D object.

5 Claims, 5 Drawing Sheets

(56) References Cited

U.S. PATENT DOCUMENTS

| | | |
|---|---|---|
| 2013/0171431 A1 | 7/2013 | Swartz et al. |
| 2013/0241095 A1 | 9/2013 | Korten et al. |
| 2015/0014510 A1* | 1/2015 | Dunning ............... F16F 15/073 |
| | | 248/618 |
| 2015/0231825 A1 | 8/2015 | Swartz et al. |
| 2015/0266158 A1 | 9/2015 | Summers et al. |
| 2015/0266211 A1 | 9/2015 | Wolfgang et al. |
| 2018/0065186 A1* | 3/2018 | Cullinan ............... H01L 21/563 |

OTHER PUBLICATIONS

International Search Report and Written Opinion for International Publication No. PCT/US2016/029920 dated Dec. 29, 2016, 9 pages.

\* cited by examiner

THREE-DIMENSIONAL (3D) PRINTING

BACKGROUND

Additive manufacturing processes can produce three-dimensional (3D) objects by providing a layer-by-layer accumulation and unification of material patterned from a digital model. In 3D printing, for example, digitally patterned portions of successive material layers can be joined together by fusing, binding, or solidification through processes including sintering, extrusion, and irradiation. The quality, strength, and functionality of objects produced by such systems can vary depending on the type of additive manufacturing technology used. In general, lower quality and lower strength objects can be produced using lower cost systems, while higher quality and higher strength objects can be produced using higher cost systems.

BRIEF DESCRIPTION OF THE DRAWINGS

Examples will now be described with reference to the accompanying drawings, in which.

Throughout the drawings, identical reference numbers designate similar, but not necessarily identical, elements.

DETAILED DESCRIPTION

Figure 1:
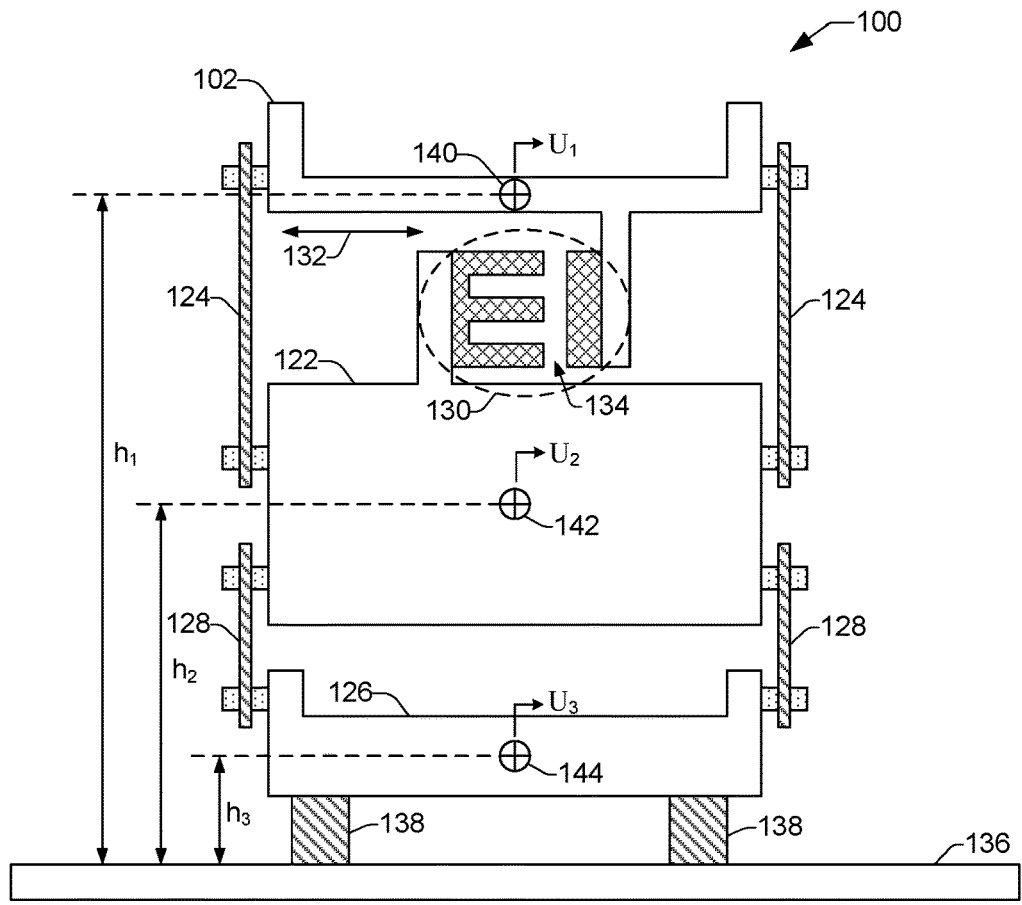
FIG. 1 shows an example of a 3D printing system suitable for vibrating a printing tray of the system to separate unfused build material from fused build material that forms a 3D object.

In some examples of three-dimensional (3D) printing, 3D objects can be produced in a 3D printing system (i.e., a 3D printer) by depositing and processing layers of build material. Layers of build material can be successively deposited into the work area of a printing tray or platform. A fusing agent can be selectively applied to layers of the build material in areas where the build material is to be fused together. The fusing agent can coat the exterior surface of a layer of build material and penetrate into the layer of build material. The work area can be exposed to fusing energy such as light radiation. The fusing agent applied to the build material is capable of absorbing the fusing energy and converting it into thermal energy. The thermal energy can fuse the areas of the build material to which the fusing agent has been applied. This process can be repeated as each layer of build material is deposited into the work area, thus forming a build volume in the printing tray that comprises both fused and unfused areas of build material.

The fused portion of a build volume comprises the 3D object that is being produced. The remaining unfused portion of the build volume that surrounds the fused 3D object comprises a weakly fused continuum of build material that can be broken apart through agitation. In some examples, the printing tray in which the build volume has been formed can be vibrated to separate the unfused and/or weakly fused build material from the fused material in order to reveal the fused 3D object. Vibrating the printing tray can be achieved, for example, by applying a horizontal force against the tray to vibrate the tray in a horizontal direction. In some examples, a force actuator can apply an oscillating force that pushes equally and oppositely against the tray and a reaction mass in order to horizontally vibrate the tray that holds the build volume. The reaction mass, in turn, can push against the chassis of the 3D printing system, creating a rotary imbalance of the chassis. The rotary imbalance can generate unwanted vertical reaction forces against the floor or support platform on which the 3D printing system rests. The vertical reaction forces can cause unwanted vibrations in the floor or platform.

In some examples disclosed herein, a 3D printing system and method of 3D printing enable vibrating a printing tray that holds a build volume to separate fused and unfused build material while minimizing the rotary imbalance of the system chassis that excites the unwanted forces against the floor or support platform. An example 3D printing system includes an electromagnetic force actuator to apply equal and opposite force to the tray and to a reaction mass. The system includes elastic support members such as leaf springs interposed between the printing tray and a reaction mass, and between the reaction mass and the system chassis. The system includes flexible mounts affixed to the chassis to engage the floor or support platform on which the system rests. Spring constants can be determined for the elastic support members and for the flexible mounts so that the elastic support members and the mounts can be properly sized to create a resonant condition that maximizes the vibration of the build volume within the printing tray, while minimizing the rotary imbalance that excites unwanted floor vibration.

In a particular example, a method of operating a three-dimensional (3D) printing system includes forming a fused 3D object in the printing tray of a 3D printer, and then vibrating the tray to separate unfused material from the fused 3D object. In an implementation, vibrating the tray includes applying a horizontal force to the tray while minimizing a force reaction moment against the floor or other support platform on which the 3D printer rests.

In another example, a 3D printing system includes a tray in which a 3D object is to be built. The tray is coupled to a reaction mass by first flexible support members. The reaction mass is coupled to the chassis of the 3D printing system by second flexible support members. The 3D printing system includes an actuator to horizontally vibrate the tray by applying an equal and opposite force to the tray and the reaction mass.

In another example, a method of operating a 3D printing system includes producing a build volume within a printing tray of a 3D printer. The method also includes vibrating the build volume to separate unfused material from fused material. In some implementations, vibrating the build volume can include varying the frequency and/or magnitude of an oscillating force applied by a force actuator to the printing tray.

Figure 2:
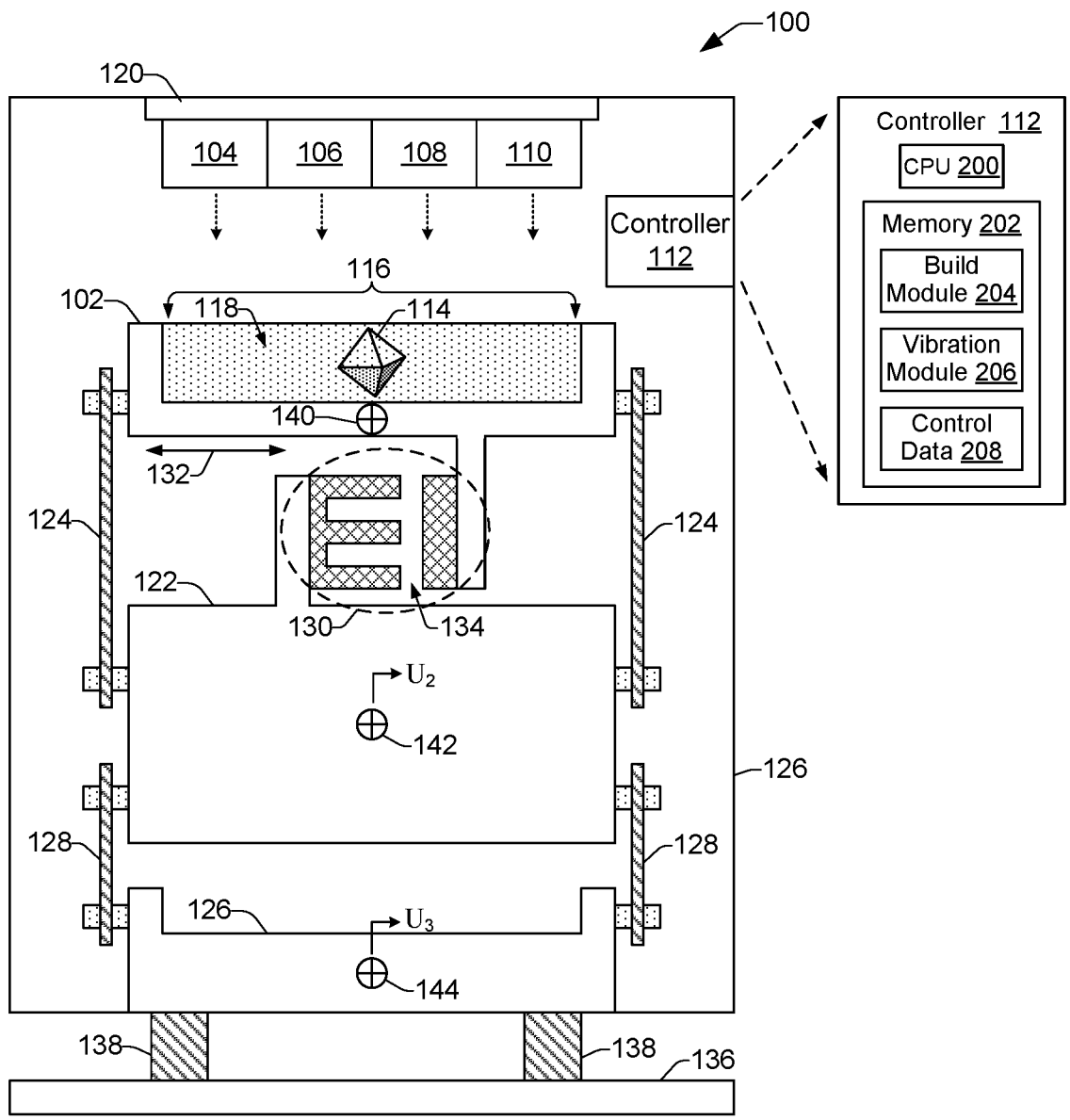
FIG. 2 shows an example of the 3D printing system of FIG. 1 with additional details, including additional system components that enable the formation of a build volume comprising unfused build material and fused build material that forms a fused 3D object.

FIG. 1 shows an example of a 3D printing system 100 suitable for vibrating a printing tray 102 of the system to separate unfused build material from fused build material that forms a 3D object. FIG. 2 shows an example of the 3D printing system 100 of FIG. 1 with additional details, including additional system components (104, 106, 108, 110, 112) that enable the formation of a build volume 116 comprising unfused build material 118 and fused build material 114 that forms a fused 3D object 114 within the build volume 116.

Referring now to FIGS. 1 and 2, an example 3D printing system 100 includes a build tray or printing tray 102 on which a 3D object 114 can be produced. The system 100 includes a controller 112 that can control the functionality of various system components to enable the production of the 3D object 114. In general, the production of a 3D object 114 includes the formation of a build volume 116 that comprises unfused build material 118 and fused build material 114, and the subsequent vibration or agitation of the build volume 116 within the printing tray 102 to separate the fused build material 114 (i.e., the 3D object 114) from the unfused build material 118.

As shown in FIG. 2, an example controller 112 can include a processor (CPU) 200 and a memory 202. The controller 112 may additionally include other electronics (not shown) for communicating with and controlling the various components of 3D printing system 100, such as discrete electronic components and an ASIC (application specific integrated circuit). Memory 202 can include both volatile (i.e., RAM) and nonvolatile memory components (e.g., ROM, hard disk, optical disc, CD-ROM, magnetic tape, flash memory, etc.). The components of memory 202 comprise non-transitory, machine-readable (e.g., computer/processor-readable) media that provide for the storage of machine-readable coded program instructions, data structures, program instruction modules, JDF (job definition format), and other data and/or instructions executable by a processor 200 of the 3D printing system 100.

An example of instructions stored in memory 202 include instructions associated with modules 204 and 206, while an example of stored data includes control data 208. In some examples, controller 112 can receive data 208 from a host system such as a computer. Data 208 represents, for example, object files defining 3D objects to be produced on the 3D printing system 100. Thus, data 208 comprises 3D print jobs that can include commands and/or command parameters for controlling the distribution of build material into the tray 102, the application of fusing agents onto layers of the build material, the application of radiation to the layers of build material, and so on. Using control data 208, the processor 200 can execute instructions (e.g., from build module 204) to control components of printing system 100 to produce a build volume 116 comprising a fused 3D object. In general, modules 204 and 206 include programming instructions executable by processor 200 to cause the 3D printing system 100 to perform various functions related to producing and vibrating a build volume 116, such as the operations of methods 500, 600, and 700, described below with respect to FIGS. 5, 6, and 7, respectively.

Instructions from build module 204, for example, are executable on processor 200 to control a build material supply 104 to feed build material 118 into the printing tray 102. A material spreading device 106, such as a roller or a blade, can be controlled to spread layers of the build material 118 into the tray 102. The build material 118 from supply 104 can comprise powdered material made from various materials suitable for producing 3D objects, including for example, polymers such as nylon, polystyrene and other thermoplastics, as well as ceramic, metal and other materials.

Layers of powdered build material 118 from the supply 104 can be successively deposited and spread into the printing tray 102 to form a build volume 116. Although the build material 118 is deposited on a layer-by-layer basis into the tray 102, distinct layers of the build 118 material are not shown in FIGS. 1 and 2. Instead, the build material 118 is shown in FIG. 2 in the form of a build volume 116 that has been built up as layers of build material 118 have accumulated within the tray 102. As each layer of build material is spread into the tray 102, an inkjet printhead 108 or printheads can scan over the tray 102 in a back and forth manner or in a page-wide array configuration to selectively deposit a fusing agent or other liquid functional material onto the layer. A fusing agent can be deposited onto regions of each layer in areas where the build material is to be fused together to form part of the 3D object 114. The fusing agent can coat the exterior surface of a layer of build material and penetrate into the layer of build material. In general, a fusing agent improves the absorption of fusing energy and the conversion of fusing energy into thermal energy to facilitate fusing the areas of build material that form part of the 3D object. Other liquid functional materials can include, for example, detailing agents that can enhance, refine, smooth, etc., the edge(s) of a layer of build material and/or provide different levels of curing or fusing within layers of the 3D object that is being formed.

After a fusing agent has been applied to a layer of build material 118, the build material can be exposed to fusing energy such as radiation from a radiation source 110. A radiation source 110 can be implemented, for example, as an IR (infra-red), near-IR, UV (ultra-violet), or visible curing lamp and/or LEDs (light emitting diodes), or as a laser. In some examples, a 3D printing system includes a carriage 120 to support and convey various components over the printing tray 102 to process the build material 118. Thus, components such as the radiation source 110, the printhead(s) 108, and the material spreading device 106 can be supported and/or conveyed by a carriage 120. The layer-by-layer process of depositing and spreading build material into the printing tray 102, applying a fusing agent, and selectively exposing the build material to fusing energy, can be repeated until a build volume 116 has been formed within the printing tray 102. As mentioned above, a build volume 116 comprises both unfused build material 118 and fused build material 114 that can be separated from one another by agitation or vibration to reveal a fused 3D object formed by the fused build material 114.

In a hypothetical system, agitating or vibrating a build volume 116 within a printing tray 102 can be achieved by a force actuator applying horizontal forces against a printing tray to vibrate the tray in a horizontal direction. When the force actuator pushes against the printing tray, however, it also pushes equally and oppositely against whatever member (e.g., system chassis or other mass) is coupled to the force actuator. The tray and the coupled member would therefore tend to move in opposite directions and produce a rotary imbalance causing vertical reaction forces against the floor or platform on which the system rests. These vertical reaction forces, in turn, can produce unwanted floor vibration.

Accordingly, in addition to the various components that enable formation of a build volume 116, the example 3D printing system 100 of FIGS. 1 and 2 includes components that enable the application of a horizontal oscillating force against the printing tray 102 to vibrate the tray 102 and the build volume 116 while minimizing the rotary imbalances that can cause unwanted floor vibrations. Such components include a reaction mass 122 coupled to the printing tray 102 by first flexible support members 124, and the system chassis 126 coupled to the reaction mass 122 by second flexible support members 128. The chassis 126 of the system 100 can rest on or against a floor 136 or support platform through flexible system mounts 138. In general, by tilting the first flexible support members 124 between the tray 102 and the reaction mass 122, tray vibration with both horizontal and vertical components can be generated that can both loosen and transport weakly fused material from the build volume 116.

A force actuator 130 is functionally disposed between the printing tray 102 and the reaction mass 122 to impart an oscillating force against the tray in a horizontal direction as indicated by direction arrow 132. The example force actuator 130 illustrated in FIGS. 1 and 2 comprises an electromagnetic force actuator that imparts a horizontal oscillating force against the tray 102 through a narrow air gap 134 to vibrate the tray 102 and build volume 116 within the tray. Other types of force actuators that may be suitable for vibrating the printing tray 102 include, for example, eccentric rotating mass vibration motors, voice coil motors, and so on.

Flexible support members such as the first and second flexible support members 124 and 128, can be implemented as any suitably flexible support members that enable movement between the two masses to which the flexible support members are attached. For example, the first flexible support members 124 are coupled to a first mass comprising the printing tray 102 and to a second mass comprising the reaction mass 122, and the first flexible support members 124 enable the two masses to move with respect to one another. Similarly, the second flexible support members 128 are coupled to the reaction mass 122 and to the mass of the chassis 126, and the second flexible support members 128 enable the two masses to move with respect to one another. A flexible support member can be implemented, for example, as a leaf spring, a coil spring, or a torsion spring.

The flexible system mounts 138 are coupled to the chassis 126 and support the 3D printing system 100 as it rests against the floor 136 or platform. The flexible system mounts 138 can be implemented, for example, as resilient mounts made of rubber or some other suitable resilient material that helps to isolate vibration of the chassis 126 from the floor 136 or platform on which the system 100 rests. The flexible support members 124, 128, and system mounts 138 have intrinsic spring rates (i.e., spring constants) that can be adjusted to increase or decrease the flexibility of the support members and mounts. The spring constants for the flexible support members 124, 128, and flexible system mounts 138 can be adjusted, for example, by adjusting the geometry and material of the members.

When the force actuator 130 generates a force to push against the printing tray 102, the force pushes equally and oppositely against the reaction mass 122. The reaction mass 122, in turn, pushes against the system chassis 126 through the second flexible support members 128, which tends to create a rotary imbalance in the system chassis 126. When force is applied by the actuator 130, the centroids 140, 142, and 144 of the tray 102, the reaction mass 122, and the chassis 126, respectively, can be horizontally displaced by respective amounts U1, U2, and U3. The imbalance of the system chassis 126 causes the chassis 126 to push against the floor/platform 136 through the flexible system mounts 138 with vertical reaction forces that can cause unwanted floor vibration.

The controller 112 can control the force actuator 130 and the application of an oscillating horizontal force against the printing tray 102. For example, instructions from a vibration module 206 are executable on processor 200 to control the magnitude and frequency of an oscillating force (i.e., the forcing frequency) applied by the force actuator 130 to the printing tray 102. In some examples, varying the vibration frequency and/or the vibration magnitude can enable a more efficient separation of unfused build material from fused build material in the build volume 116. In such examples, the forcing frequency can be varied to match the dynamic resonance of the system, thereby maximizing the tray vibration response. Such control of the forcing frequency is useful in some implementations to adapt to the loss of mass associated with removal of the separated unfused and/or weakly fused material.

After being separated by vibration from the fused build material, the unfused and/or weakly fused build material (i.e., powder) can be removed from the tray 102 in a variety of ways. For example, the unfused powder can be vacuumed from the tray through manifold paths above or below the tray. Such paths can comprise, for example, multiple tubes and/or a perforated tray above a plenum through which air and powder are drawn. In some examples the tray can comprise a peripheral area that is grated to permit powder to pass through during vibration of the tray. In some examples the flexible support members (e.g., leaf springs) can be tilted during vibration to migrate powder off of the tray.

Figure 3:
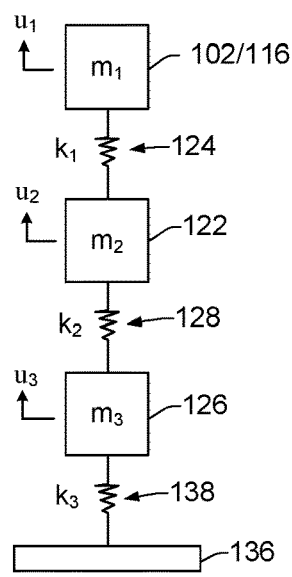
FIG. 3 shows an example of a dynamic model that represents the example 3D printing system of FIG. 1 as a three-mass system.

FIG. 3 illustrates an example of a dynamic model that represents the example 3D printing system 100 as a three-mass system. As shown in FIG. 3, the printing tray 102 and build volume 116 together, can be represented within the dynamic model by a mass, $m_1$. Similarly, the reaction mass 122 and system chassis 126 can be represented by masses $m_2$ and $m_3$, respectively. The spring constants of the flexible support members 124, 128, and the flexible system mounts 138 can be represented within the dynamic model by constants $k_1$, $k_2$, and $k_3$, respectively.

A resonant system condition in which vibration of the tray 102 and build volume 116 is maximized while system rotary imbalance is minimized, can be derived using equations (1) through (6) below. This can be accomplished by finding a particular resonant vibration pattern, or mode shape, that maintains the system centroid and eliminates system rotary imbalance, and then selecting (i.e., determining) the appropriate spring constants ($k_1$, $k_2$, and $k_3$) within an example 3D printing system 100 to realize the mode shape. When the system comprised of the tray 102, the reaction mass 122 and the chassis 126 vibrates with this particular mode shape (vibration pattern), zero angular momentum occurs, and therefore, no vertical reactions against the floor 132 are developed to maintain dynamic rotary equilibrium.

$$\begin{bmatrix} m_1 & & \\ & m_2 & \\ & & m_3 \end{bmatrix}\begin{pmatrix} \ddot{u}_1 \\ \ddot{u}_2 \\ \ddot{u}_3 \end{pmatrix} + \begin{bmatrix} k_1 & -k_1 & 0 \\ -k_1 & k_1+k_2 & -k_2 \\ 0 & -k_2 & k_2+k_3 \end{bmatrix}\begin{pmatrix} u_1 \\ u_2 \\ u_3 \end{pmatrix} = 0 \quad (1)$$

$$m_1 U_1 + m_2 U_2 + m_3 U_3 = 0 \quad (2)$$

$$m_1 h_1 U_1 + m_2 h_2 U_2 + m_3 h_3 U_3 = 0 \quad (3)$$

$$(-w^2 m_1 U_1 - k_1)U_1 - k_1 U_2 = 0 \quad (4)$$

$$-k_1 U_1 + (-w^2 m_2 + k_2)U_2 - k_2 U_3 = 0 \quad (5)$$

$$-k_2 U_2 + (-w^2 m_3 + k_3)U_2 = 0 \quad (6)$$

The variables and symbols illustrated in FIGS. 1-3, and in equations (1) through (6), can be defined as follows in Table 1.

TABLE 1

| | |
|---|---|
| $m_i$ | Mass |
| ⊕ | mass centroid (center of mass) |
| $k_i$ | spring constant (stiffness) |
| $h_i$ | Height |
| $U_i$ | mode shape element |
| $u_i$ | displacement |
| t | time |
| $\ddot{u}_i$ | acceleration (2$^{nd}$ time derivative of displacement) |
| w | angular frequency |
| τ | torque, or moment |

The solution to matrix equation (1) with its zero right hand side is an unforced resonant response that maximizes vibration of the mass, $m_1$, of the printing tray 102 and build volume 116. The linear momentum equation (2) with its zero right hand side enforces the condition of unchanging linear momentum and unchanging location of the centroid (center of mass). The angular momentum equation (3) with its zero right hand side enforces the condition of zero change in angular momentum, thereby minimizing floor vibrations by the suppression of torque reactions generally needed to counteract rotary imbalance. The assumption has been made that spring rate $k_3$ is much less than the spring rates $k_1$ and $k_2$ in Equations (2) and (3). This assumption can be realized by the use of soft elastomeric material in system mounts 130 relative to the metal material of flexible support members 124 and 128. Equation (2) may be obtained by summing the three equations in matrix equation (1) and expressing displacements $u_i$ in terms of mode shape amplitudes $U_i$ and angular frequency w through the relation $u_i = U_i \sin wt$, where w is angular frequency, t is time, and index i=1,2,3 denotes the mass element. Equations (4) through (6) are the three individual equations of matrix equation (1) written in terms of the mode shape elements $U_i$ and angular frequency w, respectively describing the dynamics of mass $m_1$, comprised of the printing tray 102 and the build volume 116, reaction mass $m_2$, and foundation $m_3$. The mode shape $[U_1\ U_2\ U_3]^T$ is a scale independent 3-element vector that describes the pattern of vibration at resonance of the three masses $m_i$. Superscript T denotes transpose. The scale independent quality of the mode shape allows mode shape elements $U_i$ to be scaled arbitrarily while preserving their relative magnitudes.

Equations (7) and (8) express mode shape elements $U_2$ and $U_3$ in terms of mode shape element $U_1$ and is obtained by solving equations (2) and (3) in terms of $U_1$. The mode shape may be conveniently scaled such that mode shape element $U_1$ is equal to unity (i.e., one).

$$U_2 = -\frac{m_1(h_1 - h_3)}{m_2(h_2 - h_3)} U_1 \quad (7)$$

$$U_3 = -\frac{m_1(h_1 - h_2)}{m_3(h_3 - h_2)} U_1 \quad (8)$$

The unknown spring constants $k_1$ and $k_2$ can then be determined by using equations (9) and (10) shown below, which are obtained by solving equations (4) and (6) for $k_1$ and $k_2$ in terms of the known mode shape elements $U_1$, $U_2$, and $U_3$.

$$k_1 = \frac{w^2 m_1 U_1}{U_1 - U_2} \quad (9)$$

$$k_2 = \frac{(w^2 m_3 + k_3) U_3}{U_3 - U_2} \quad (10)$$

Figure 4:
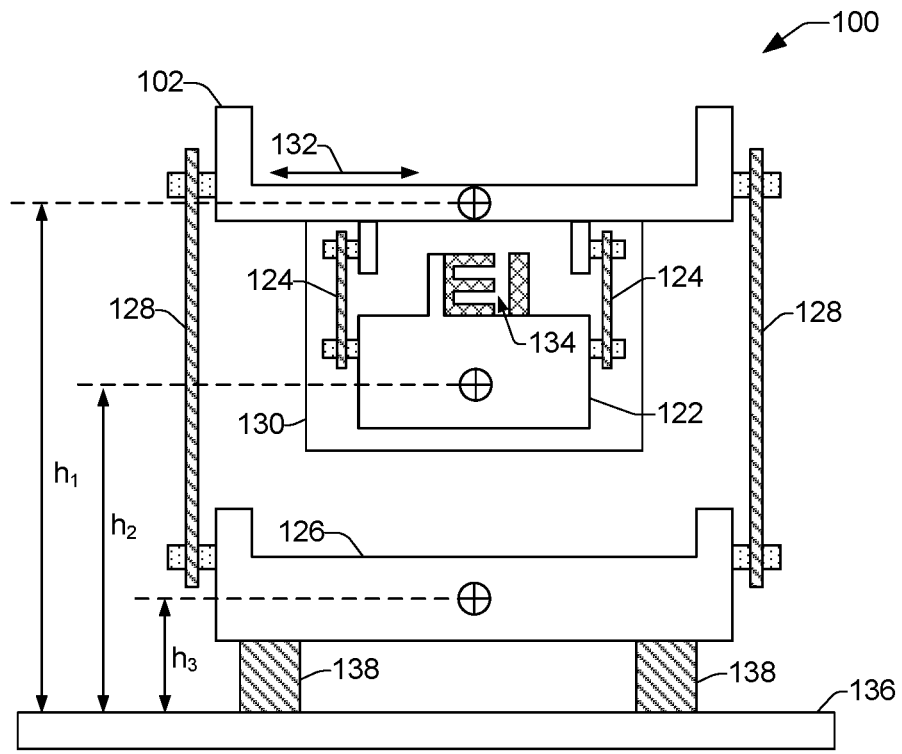
FIG. 4 shows an alternate example of a 3D printing system in which a reaction mass is an integral component of a force actuator coupled to the printing tray of the system.

FIG. 4 illustrates an alternate example of a 3D printing system 100 in which the reaction mass 122 is an integral component of the force actuator 130. In this example, the force actuator 130 can be mounted directly to the printing tray 102 and can apply an oscillating force to the tray in a horizontal direction 132. The first flexible support members 124 are also integral to the force actuator 130 to flexibly support the reaction mass 122 within the body of the actuator 130. In this example, the second flexible support members 128 couple the printing tray 102 to the system chassis 126.

Figure 5:
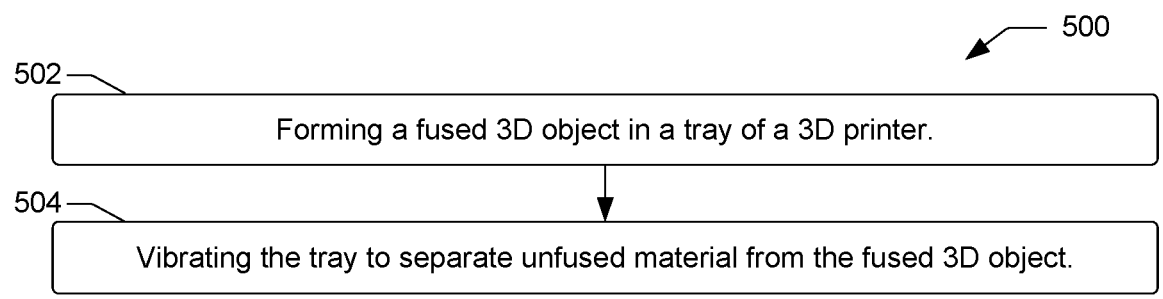
FIGS. 5, 6, and 7, are flow diagrams showing example methods of operating a 3D printing system.
Figure 6:
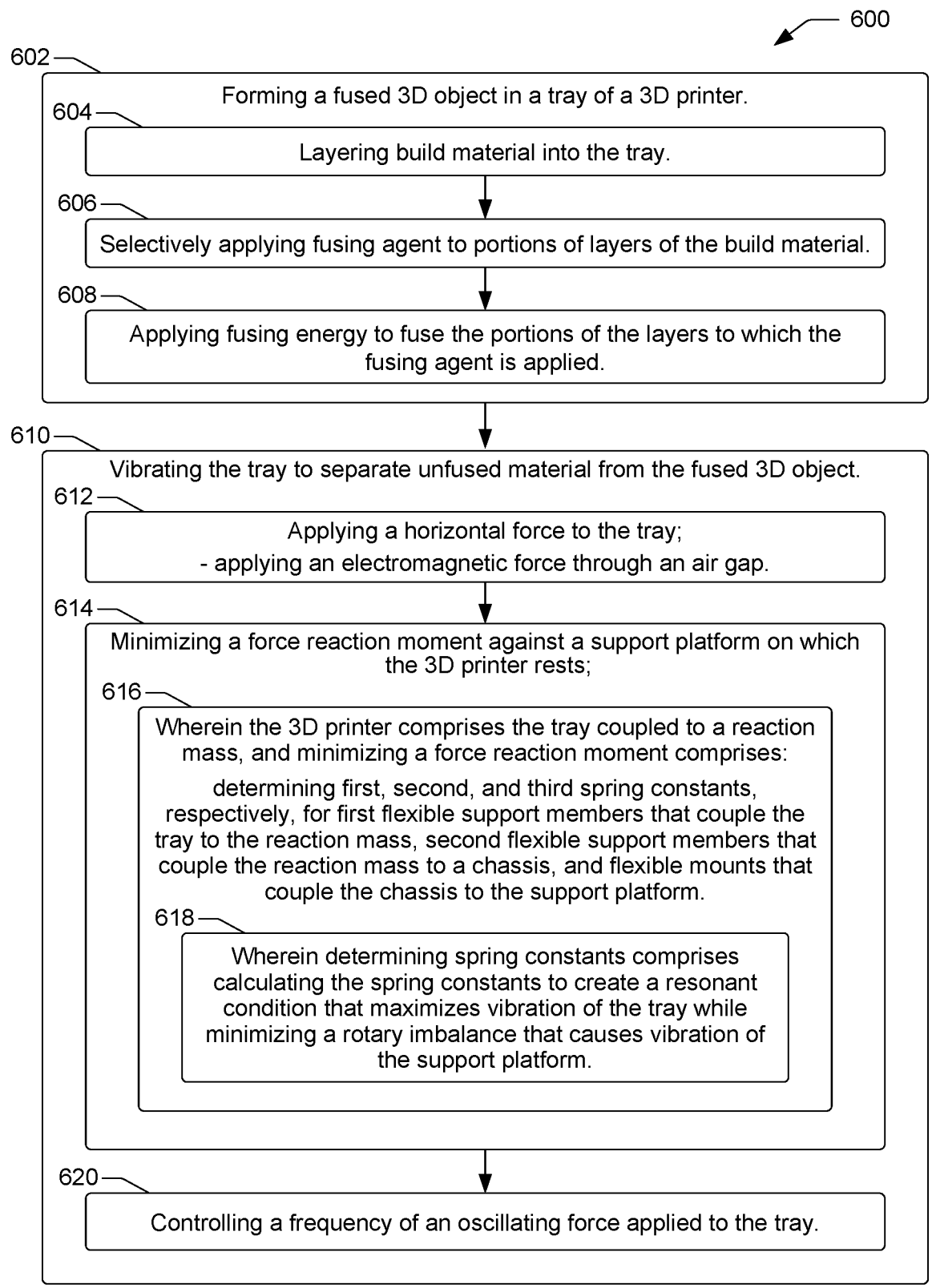
Figure 7:
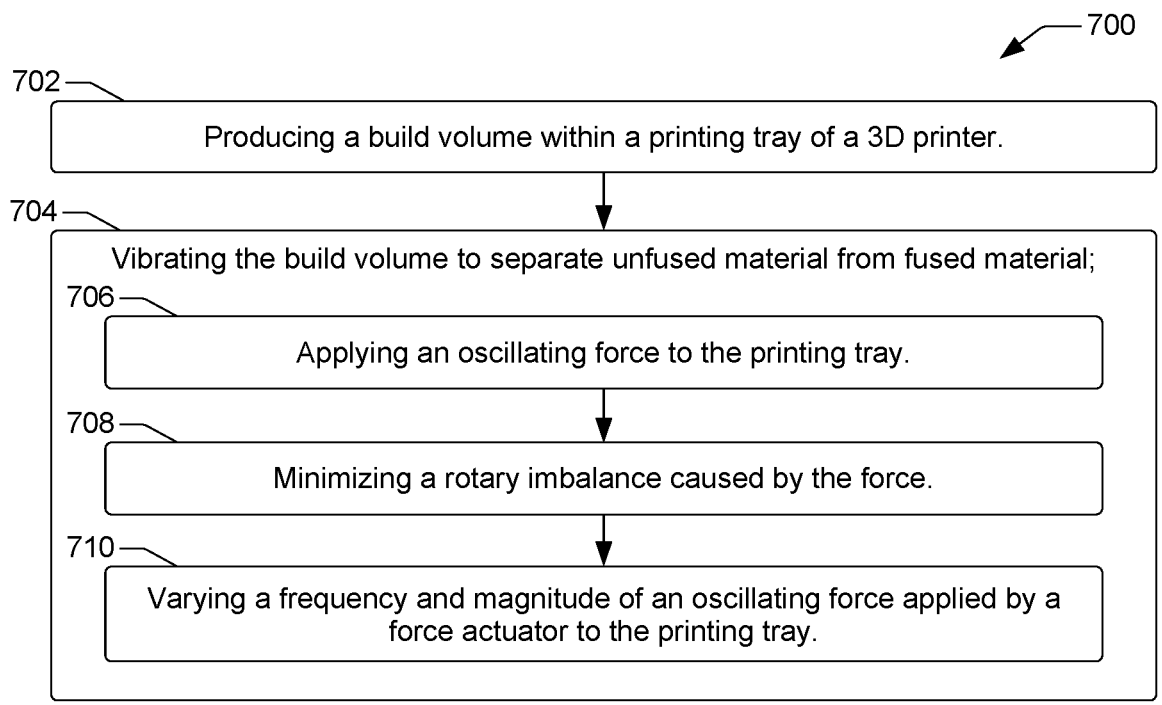

FIGS. 5, 6, and 7, are flow diagrams showing example methods 500, 600, and 700, of operating a three-dimensional (3D) printing system. Method 600 is an extension of method 500 that incorporates additional details. Referring now to method 500 of FIG. 5, an example method of operating a 3D printing system includes first, forming a fused 3D object in a tray of a 3D printer as shown at block 502. The fused 3D object can comprise fused build material surrounded by unfused or weakly fused build material within a build volume. As shown at block 504, the method 500 includes vibrating the printing tray to separate unfused material from the fused 3D object.

Referring now to FIG. 6, an example method 600 of operating a 3D printing system provides additional details to the method 500. Thus, the method 600 begins at block 602 with forming a fused 3D object in a tray of a 3D printer. In some examples, forming a fused 3D object in a tray of a 3D printer includes layering build material into the tray, selectively applying fusing agent to portions of layers of the build material, and applying fusing energy to fuse the portions of the layers to which the fusing agent is applied, as shown, respectively, at blocks 604, 606, and 608.

The method 600 can continue as shown at block 610, with vibrating the tray to separate unfused material from the fused 3D object. As shown at block 612, in some examples vibrating the tray can include applying a horizontal force to the tray. Applying a force can include applying an electromagnetic force through an air gap. Vibrating the tray can also include minimizing a force reaction moment against a support platform on which the 3D printer rests, as shown at block 614.

In some examples, where the 3D printer comprises the tray coupled to a reaction mass, as shown at block 616, minimizing a force reaction moment includes determining first, second, and third spring constants, respectively, for first flexible support members that couple the tray to the reaction mass, second flexible support members that couple the reaction mass to a chassis, and flexible mounts that couple the chassis to the support platform. Determining spring constants can include calculating the spring constants to create a resonant condition that maximizes vibration of the tray while minimizing a rotary imbalance that causes vibration of the support platform, as shown at block 618.

In some examples, as shown at block 620, vibrating the tray can include controlling the frequency of the oscillating force applied to the tray.

Referring now to method 700 of FIG. 7, an example method 700 of operating a 3D printing system includes producing a build volume within a printing tray of a 3D printer, as shown at block 702. A build volume can include fused and unfused build material. As shown at block 704, the method 700 can include vibrating the build volume to separate the unfused build material from the fused build material. Vibrating the build volume can include applying an oscillating force to the printing tray while minimizing a rotary imbalance caused by the force, as shown respectively in blocks 706 and 708. Vibrating the build volume can also include varying the frequency and the magnitude of an oscillating force being applied by a force actuator to the printing tray, shown at block 710.

What is claimed is:

1. A three-dimensional (3D) printing system comprising:
    a tray in which a 3D object is to be built;
    a reaction mass coupled to the tray by first flexible support members;
    a chassis coupled to the reaction mass by second flexible support members; and,
    a force actuator coupled to the reaction mass to apply an oscillating force to the tray to horizontally vibrate the tray, the force actuator comprising an electromagnetic air gap actuator disposed between the tray and the reaction mass.

2. A 3D printing system as in claim 1, further comprising flexible mounts to mount the chassis to a floor on which the 3D printing system is to rest.

3. A 3D printing system as in claim 2, wherein the first flexible support members, the second flexible support members, and the flexible mounts comprise, respectively, first, second, and third spring constants that are tuned to maximize vibration to the tray while minimizing a moment reaction to the floor caused by the force.

4. A 3D printing system as in claim 1, wherein the flexible support members comprise leaf springs.

5. A 3D printing system as in claim 1, wherein the force actuator comprises a force actuator selected from an eccentric rotating mass vibration motor and a voice coil motor.

* * * * *